(12) United States Patent
Ijima et al.

(10) Patent No.: US 7,965,434 B2
(45) Date of Patent: Jun. 21, 2011

(54) DISPLAY ELEMENT

(75) Inventors: Tomoaki Ijima, Tokyo (JP); Takeshi Hakii, Sagamihara (JP)

(73) Assignee: Konica Minolta Holdings, Inc. (JP)

( * ) Notice: Subject to any disclaimer, the term of this patent is extended or adjusted under 35 U.S.C. 154(b) by 157 days.

(21) Appl. No.: 12/439,986

(22) PCT Filed: Aug. 28, 2007

(86) PCT No.: PCT/JP2007/066634
§ 371 (c)(1),
(2), (4) Date: Mar. 4, 2009

(87) PCT Pub. No.: WO2008/029669
PCT Pub. Date: Mar. 13, 2008

(65) Prior Publication Data
US 2009/0207479 A1    Aug. 20, 2009

(30) Foreign Application Priority Data
Sep. 8, 2006 (JP) ................. 2006-244031

(51) Int. Cl.
*G02F 1/153* (2006.01)
*G02F 1/15* (2006.01)
(52) U.S. Cl. .................. 359/270; 359/265; 359/321
(58) Field of Classification Search .................. 359/321, 359/265, 266, 270, 296–298; 345/105, 107; 313/311, 358; 428/1.4
See application file for complete search history.

(56) References Cited

U.S. PATENT DOCUMENTS

| | | | |
|---|---|---|---|
| 7,184,198 B2 * | 2/2007 | Kokeguchi et al. | 359/296 |
| 7,324,259 B2 * | 1/2008 | Kokeguchi et al. | 359/265 |
| 7,518,777 B2 * | 4/2009 | Kokeguchi | 359/270 |
| 7,697,189 B2 * | 4/2010 | Kokeguchi | 359/270 |
| 7,773,285 B2 * | 8/2010 | Kokeguchi | 359/270 |
| 2001/0014420 A1 | 8/2001 | Takeuchi et al. | |
| 2010/0165449 A1 * | 7/2010 | Hakii | 359/297 |

FOREIGN PATENT DOCUMENTS

| | | |
|---|---|---|
| EP | 0 956 603 B1 | 12/2002 |
| JP | 9-309173 A | 12/1997 |
| JP | 10-148853 A | 6/1998 |
| JP | 2005-338515 A | 12/2005 |
| JP | 2005-345777 A | 12/2005 |
| JP | 2006-201454 A | 8/2006 |
| JP | 2006-227488 A | 8/2006 |
| WO | 97/35351 A1 | 9/1997 |
| WO | 2006/082700 A1 | 8/2006 |

OTHER PUBLICATIONS

Extended European Search Report for Application No./Patent No. 07793074.1-2205/2058699 dated Jun. 18, 2010.
International Search Report for International Application No. PCT/JP2007/066634 mailed Dec. 4, 2007 with English translation.

* cited by examiner

*Primary Examiner* — Loha Ben
(74) *Attorney, Agent, or Firm* — Cantor Colburn LLP

(57) ABSTRACT

This invention provides a display element comprising an electrolyte between opposed electrodes. The electrolyte contains silver, or a compound containing silver. The opposed electrodes are driven and operated so that silver is dissolved and precipitated. The display element is characterized in that this electrolyte satisfies the following requirements a to c: a. a cyclic carboxylic acid ester having a dielectric constant of not less than 30 and not more than 50 is contained as an organic solvent; b. formula (1) is satisfied: $0<[x]/[Ag]\leq 0.1$ (1) wherein [x] represents the total molar concentration (mol/kg) of halogen ions or halogen atoms contained in halide molecules; and [Ag] represents a total molar concentration (mol/kg) of silver or a compound containing silver; and c. the concentration of silver or a compound containing silver in an organic solvent is not less than 0.2 mmol/g and not more than 0.5 mmol/g.

10 Claims, No Drawings

DISPLAY ELEMENT

CROSS REFERENCE TO RELATED APPLICATIONS

This is a U.S. national stage of application No. PCT/JP2007/066634, filed on 28 Aug. 2007. Priority under 35 U.S.C. §119(a) and 35 U.S.C. §365(b) is claimed from Japanese Application No. 2006-244031, filed 8 Sep., 2006, the disclosure of which is also incorporated herein by reference.

TECHNICAL FIELD

The present invention relates to an electrochromic display element employing silver dissolution and deposition.

BACKGROUND

In recent years, with enhancement of operation speed of personal computers, widespread use of network infrastructure, and realization of mass storage of data, as well as cost reduction of data storage, there are increasing occasions in which information of documents and images, having been conventionally provided in the form of printed paper matter, is received and viewed as more convenient electronic information.

As viewing methods for such electronic information, there are mainly used those which are of light emitting types such as conventional liquid crystal display devices and CRTs, or organic EL display devices, which have recently been marketed. Especially, however, when electronic information is composed of items of document information, it is necessary to stare at these viewing devices for a relatively long time, which is certainly not viewer-friendly. It is commonly known that light emitting type display devices have disadvantages such as eye fatigue due to flicker, inconvenience of portability, limited reading posture, necessity to look closely at still images, and high power consumption due to the use of these devices for long-time reading.

As display devices to overcome these disadvantages, there are known memory effect reflective display devices, which utilize external light, resulting in consuming no electrical power to retain images. However, these devices do not exhibit adequate performance due to the following reasons.

Namely, a system, employing a polarizing plate such as a reflective type liquid crystal, creates a problem in white display due to its low reflectance of approximately 40%, and most of the production methods of constituent members are neither simple nor easy. Further, polymer dispersion type liquid crystals require a high operating voltage and exhibit poor contrast of resultant images due to the utilization of a refractive index difference between the used organic compounds. Still further, polymer network type liquid crystals have problems such that high operating voltages result and complicated TFT circuits are required to enhance memory capability. Yet further, display elements employing electrophoresis require a high operating voltage of at least 10 V and tend to exhibit low operation life due to electrophoretic particle aggregation. In contrast, although being drivable at a low voltage of at most 3 V, electrochromic display elements have the disadvantage of exhibiting poor color quality of black or colors (such as yellow, magenta, cyan, blue, green, and red), as well as having the disadvantage that each display cell requires a complicated film structure such as a vapor deposition film to ensure memory capability.

As a display system to overcome any of the disadvantages in each of the systems described above, there is known an electrode deposition (hereinafter referred to simply as ED) system employing dissolution and deposition of a metal or metallic salt. The ED system is drivable at a low voltage of at most 3 V, and features advantages such as a simple cell structure and excellence in black and white contract, as well as in black image quality, resulting in disclosure of a variety of systems (for example, refer to Patent Documents 1-3).

The present inventor has made detailed investigation in the technologies disclosed in each of the Patent Documents described above, and found that these conventional technologies did not realize adequate reflectance during white display or display speed to meet current user needs. For example, when a large amount of halide compound is contained in the electrolyte, it may occur undesired problems such as becoming yellowish in a white display portion due to the oxidation-reduction reaction of the halogen ions themselves or consumption of an excessive electric power (for example, refer to Patent Document 4). Examples of the proposed technologies to reduce these problems are, to replace a halide compound added in the electrolyte with a non-halide compound containing silver in the chemical structure, and further to add a mercapto compound or a thioether in the electrolyte. By these technologies, an amount of halide compounds in the electrolyte can be decreased considerably. The present inventor has extensively investigated the technologies disclosed in the aforesaid documents and has found that the display element prepared in accordance with the method described therein showed unwanted problems. These unwanted problems are such as: change of the display properties due to evaporation of an organic solvent in the electrolyte or deposition of the additives in the electrolyte when it had been stored under the condition of repeated change between low and high temperatures.

Patent Document 1: U.S. Pat. No. 4,240,716 specification
Patent Document 2: Japanese Patent Publication No. 3428603
Patent Document 3: Unexamined Japanese Patent Application Publication No. 2003-241227
Patent Document 4: Unexamined Japanese Patent Application Publication No. 2004-309798

DISCLOSURE OF THE INVENTION

Problems to be Solved by the Invention

In view of the above problems, the present invention was achieved. An object of the present invention is to provide a display element which is composed of simple constituting members and is drivable at low voltages exhibiting enhanced reflectance of white display and enhanced display speed, as well as having high stability for a change of environment of usage.

Means to Solve the Problems

The object of the present invention was achieved employing the following constitutions.

1. A display element comprising an electrolyte containing silver or a compound containing silver in a chemical structure thereof between opposed electrodes, and carrying out driving operation for the opposed electrodes to induce silver dissolution and deposition, wherein the electrolyte satisfies the following requirements (a) to (c):

(a) containing as an organic solvent a cyclic carboxylic acid ester having a dielectric constant of 30 to 50;
(b) satisfying the following expression (1), $$0 \leq [X]/[Ag] \leq 0.1 \qquad \text{Expression (1)}$$

wherein [X] is a total molar concentration (mol/kg) of halogen ions or halogen atoms contained in halide molecules, [Ag] is a total molar concentration (mol/kg) of silver or a compound containing silver in the chemical structure thereof; and (c) a concentration of silver or the compound containing silver in the chemical structure thereof in the organic solvent being from 0.2 mmol/g to 0.5 mmol/g.

2. The display element described in the aforesaid item 1, wherein the concentration of silver or the compound containing silver in the chemical structure thereof in the organic solvent which constitutes the electrolyte is from 0.25 mmol/g to 0.45 mmol/g.

3. The display element described in the aforesaid item 1 or item 2, wherein a boiling point of the aforesaid organic solvent which constitutes the electrolyte is from 180° C. to 250° C.

4. The display element described in any one of the aforesaid items 1 to 3, wherein the electrolyte contains a mercapto compound or a thioether compound.

5. The display element described in aforesaid item 4, wherein the mercapto compound is represented by Formula (1).

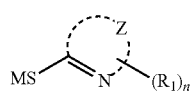

Formula (1)

(In the above Formula, M is a hydrogen atom, a metallic atom, or a quaternary ammonium. Z is a nitrogen-containing heterocycle, and n is an integer of 0-5. $R_1$ is a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxy group, or a heterocyclic group. When n is at least 2, $R_1$s may be the same or different and $R_1$s may be joined to form a condensed ring.

6. The display element described in aforesaid item 4, wherein the thioether compound is represented by Formula (2).

 Formula (2)

(In the above Formula, $R_2$ and $R_3$ each represent an alkyl group or a heterocylic group, provided that $R_2$ and $R_3$ each may be the same or different, and they may be joined to form a ring.)

7. The display element described in any one of the aforesaid items 4 to 6, wherein a total molar amount of the mercapto compound and the thioether compound is from 2 to 10 times of a total molar amount of silver or the compound containing silver in the chemical structure thereof.

8. The display element described in any one of the aforesaid items 4 to 7, comprising two or more kinds of mercapto compounds.

9. The display element described in any one of the aforesaid items 4 to 8, wherein the mercapto compounds are a mercaptotriazole or a mercaptooxadiazole.

10. The display element described in any one of the aforesaid items 4 to 9, comprising at least one mercapto compound and at least one thioether compound.

Effects of the Invention

According to the present invention, it was achieved a display element which is composed of simple constituting members and is drivable at low voltages exhibiting enhanced reflectance of white display and enhanced display speed, as well as having high stability for a change of environment of usage.

BEST MODE TO CARRY OUT THE INVENTION

The best mode to carry out the present invention will now be detailed.

In view of the above problems, the present inventor conducted diligent investigations and realized the following: in a display element having an electrolyte layer, incorporating silver or a compound containing silver in its chemical structure and a porous white scattering layer between opposed electrodes; and carrying out driving operation for the opposed electrodes to induce silver dissolution and deposition, via a display element wherein the aforesaid electrolyte contains a cyclic carboxylic acid ester having a dielectric constant of 30 to 50 as an organic solvent, the condition specified by the expression: 0≦[X]/[Ag]≦0.1, is satisfied, provided that the molar concentration of halogen ions or halogen atoms contained in an electrolyte is [X] (mol/kg); and the total molar concentration of silver or silver, contained in a compound containing silver in its chemical structure, contained in the electrode is [Ag] (mol/kg), as well as the concentration of the compound containing silver, or a compound containing silver in their chemical structure in the aforesaid organic solvent of the electrolyte is from 0.2 mmol/g to 0.5 mmol/g. The present invention was achieved by the above-described constitution. It was realized a display element having a simple member structure, being drivable at low voltages, and exhibiting enhanced display contrast and white display reflectance, as well as achieving as well as having high stability for a change of environment of usage.

The present invention will now be detailed.

The display element of the present invention is an ED system display element having an electrolyte, incorporating silver or a compound containing silver in its chemical structure, between opposed electrodes, and carrying out driving operation for the opposed electrodes to induce silver dissolution and deposition.

[Basic Structure of Display Element]

In the display element of the present invention, the ED display section is provided with a pair of opposed electrodes arranged in an opposed position to each other. Electrode 1, one of the opposed electrodes, close to the ED display section is provided with a transparent electrode such as an ITO electrode, and the other, electrode 2, is provided with a metal electrode such as a silver electrode. An electrolyte, incorporating silver or a compound containing silver in its chemical structure, is arranged between electrode 1 and electrode 2. By applying voltage of positive and negative polarity between the opposed electrodes, oxidation-reduction reaction of silver is performed on electrode 1 and electrode 2, whereby a black silver image in the reduction state and a transparent silver state in the oxidation state can reversibly be converted.

[Electrolyte]

In the present invention, the display element is provided with an electrolyte having a compound containing silver, or a compound containing silver in their chemical structure, The constituting elements of the electrolyte according to the present invention will be detailed below.

(Compound Containing Silver, or Compound Containing Silver in Chemical Structure)

A compound containing silver, or a compound containing silver in their chemical structure, according to the present invention, is common designations of a compound such as silver oxide, silver sulfide, metallic silver, colloidal silver particles, sliver halide, silver complex compound, or a silver ion. The phase states such as a solid state, a state solubilized to liquid, a gas state, and charge state types such as neutral, anionic or cationic are not particularly considered.

In the display element of the present invention, the condition specified by the expression: $0 \leq [X]/[Ag] \leq 0.1$, is satisfied, provided that the molar concentration of a halogen ion or halogen atom contained in an electrolyte is [X] (mol/kg); and the total molar concentration of silver or silver, contained in a compound containing the silver in its chemical structure, contained in the electrode is [Ag] (mol/kg).

The halogen atom referred to in the present invention refers to an iodine atom, a chlorine atom, a bromine atom, or a fluorine atom. When [X]/[Ag] is more than 0.1, $X^- \rightarrow X_2$ is induced during oxidation-reduction reaction of silver, and then $X_2$ dissolves blackened silver by readily undergoing cross-oxidation with the blackened silver, which becomes one of the factors decreasing memory capability. Therefore, the molar concentration of a halogen atom is preferably as low as possible with respect to that of silver. In the present invention, the relationship of $0 \leq [X]/[Ag] \leq 0.01$ is more preferable. When halogen ions are added, with regard to the halogen species, the sum of the molar concentration of each of the halogen species is preferably [I]<[Br]<[Cl]<[F] from the viewpoint of enhancing memory capability.

In the display element of the present invention, the concentration of the compound containing silver, or a compound containing silver in their chemical structure in the electrolyte is from 0.2 mmol/g to 0.5 mmol/g. The more preferable range of it is from 0.25 mmol/g to 0.45 mmol/g.

The concentration of silver ions contained in the electrolyte of the present invention is preferably, 0.2 mmol/g ≤ [Ag] ≤ 2.0 mmol/g. When the concentration of silver ions is less than 0.2 mmol/g, the silver ion solution will become so dilute that the resulting driving speed becomes delayed. When the concentration of silver ions is more than 2.0 mmol/g, the solubility of the silver ions will become so deteriorated that it may occur precipitation during storage at low temperature and it is not advantageous.

(Organic Solvent)

In the display element of the present invention, the specific feature is to employ the electrolyte containing a cyclic carboxylic acid ester having a dielectric constant of 30 to 50 as an organic solvent, such as γ-butyl lactone. Preferably, the boiling point of the cyclic carboxylic acid ester is from 180 to 250° C. The dielectric constant in this invention is defined as a ratio of the dielectric constant of the cyclic carboxylic acid ester to the dielectric constant of vacuum.

Specific examples of the cyclic carboxylic acid esters according to the present invention will now be listed, but the present invention is not limited by them.

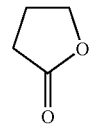

Compound L-1

Dielectric constant 39

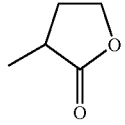

Compound L-2

Dielectric constant 42

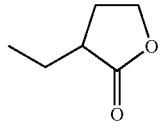

Compound L-3

Dielectric constant 45

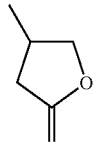

Compound L-4

Dielectric constant 41

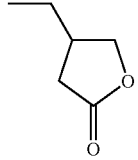

Compound L-5

Dielectric constant 44

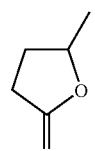

Compound L-6

Dielectric constant 42

In the present invention, in addition to the cyclic carboxylic acid esters, other organic solvents may be used as long as it does not deteriorate the object and effect of the present invention. Solvents employable in the present invention include compounds described in J. A. Riddick, W. B. Bunger, T. K. Sakano, "Organic Solvents", 4th ed., John Wiley & Sons (1986); Y. Marcus, "Ion Solvation", John Wiley & Sons (1985); C. Reichardt, "Solvents and Solvent Effects in Chemistry", 2nd ed., VCH (1988); and G. J. Janz, R. P. T. Tomkins, "Nonaquaeous Electrolytes Handbook", Vol. 1., Academic Press (1972).

(Mercapto Compound and Thioether Compound)

In the electrolyte layer of the present invention, it is preferable to incorporate a mercapto compound or a thioether compound. It is more preferable that the mercapto compound is represented by the above-mentioned Formula (1) and the thioether compound is represented by the above-mentioned Formula (2).

The total amount of the mercapto compound and the thioether compound according to the present invention is preferable in the range of 2 to 10 times of mole of Ag ions in the electrolyte. The preferable compounds among the mercapto compound and the thioether compound of the present invention are mercaptotriazole compounds and mercaptooxadiazole compounds. The mercapto compound or the thioether compound of the present invention may be used solely or in combination of plural species thereof, but more preferably, in combination of plural species thereof.

Then, the mercapto compound represented by the above-mentioned Formula (1) will now be described.

In the above-mentioned Formula (1), M is a hydrogen atom, a metallic atom, or a quaternary ammonium. Z is a nitrogen-containing heterocycle, and n is an integer of 0-5. $R_1$ is a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxy group, or a heterocyclic group. When n is at least 2, $R_1$ each may be the same or different and each may join to form a condensed ring.

The metallic atom represented by M in Formula (4) includes, for example, Li, Na, K, Mg, Ca, Zn, and Ag. The quaternary ammonium includes, for example, $NH_4$, $N(CH_3)_4$, $N(C_4H_9)_4$, $N(CH_3)_3C_{12}H_{25}$, $N(CH_3)_3C_{16}H_{33}$, and $N(CH_3)_3CH_2C_6H_5$.

The nitrogen-containing heterocycle represented by Z in Formula (1) includes, for example, a tetrazole ring, a triazole ring, an imidazole ring, an oxadiazole ring, a thiadiazole ring, an indole ring, an oxazole ring, a benzoxazole ring, a benzimidazole ring, a benzothiazole ring, a benzoselenazole ring, and a naphthoxazole ring.

The halogen atom represented by $R_1$ in Formula (1) includes, for example, a fluorine atom, a chlorine atom, a bromine atom, and an iodine atom. The alkyl group represented thereby includes, for example, a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group, and a benzyl group. The aryl group includes, for example, a phenyl group and a naphthyl group. The alkylcarbonamide group includes, for example, an acetylamino group, a propionylamino group, and a butyroylamino group. The arylcarbonamide group includes, for example, a benzoylamino group. The alkylsulfonamide group includes, for example, a methanesulfonylamino group and an ethanesulfonylamino group. The arylsulfonamide group includes, for example, a benzenesulfonylamino group and a toluenesulfonylamino group. The aryloxy group includes, for example, a phenoxy group. The alkylthio group includes, for example, a methylthio group, an ethylthio group, and a butylthio group. The arylthio group includes, for example, a phenylthio group and a tolylthio group. The alkylcarbamoyl group includes, for example, a methylcarbamoyl group, a dimethylcarbamoyl group, an ethylcarbamoyl group, a diethylcarbamoyl group, a dibutylcarbamoyl group, a piperidylcarbamoyl group, and a morpholylcarbamoyl group. The arylcarbamoyl group includes, for example, a phenylcarbamoyl group, a methylphenylcarbamoyl group, an ethylphenylcarbamoyl group, and a benzylphenylcarbamoyl group. The alkylsulfamoyl group includes, for example, a methylsulfamoyl group, a dimethylsulfamoyl group, an ethylsulfamoyl group, a diethylsulfamnoyl group, a dibutylsulfamoyl group, a piperidylsulfamoyl group, and a morpholylsulfamoyl group. The arylsulfamoyl group includes, for example, a phenylsulfamoyl group, a methylphenylsulfamoyl group, an ethylphenylsulfamoyl group, and a benzylphenylsulfamoylgroup. The alkylsulfonyl group includes, for example, a methanesulfonyl group and an ethanesulfonyl group. The arylsulfonyl group includes, for example, a phenylsulfonyl group, a 4-chlorophenylsulfonyl group, and a p-toluenesulfonyl group. The alkoxycarbonyl group includes, for example, a methoxycarbonyl group, an ethoxycarbonyl group, and a butoxycarbonyl group. The aryloxycarbonyl group includes, for example, a phenoxycarbonyl group. The alkylcarbonyl group includes, for example, an acetyl group, a propionyl group, and a butyroyl group. The arylcarbonyl group includes, for example, a benzoyl group and an alkylbenzoyl group. The acyloxy group includes, for example, an acetyloxy group, a propionyloxy group, and a butyroyloxy group. The heterocyclic group includes, for example, an oxazole ring, a thiazole ring, a triazole ring, a selenazole ring, a tetrazole ring, an oxadiazole ring, a thiadiazole ring, a thiazin ring, a benzoxazole ring, a benzothiazole ring, an indolenine ring, a benzoselenazole ring, a naphthothiazole ring, a triazaindolizine ring, a diazaindolizine ring, and a tetraazaindolizine ring. These substituents may further have a substituent.

Specific examples, which are preferable, of the compound represented by Formula (1) will now be listed that by no means limit the scope of the present invention.

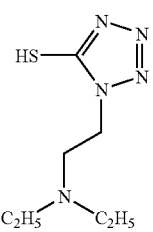

1-1

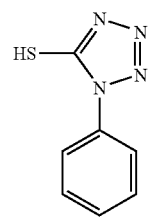

1-2

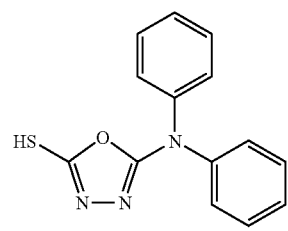

1-3

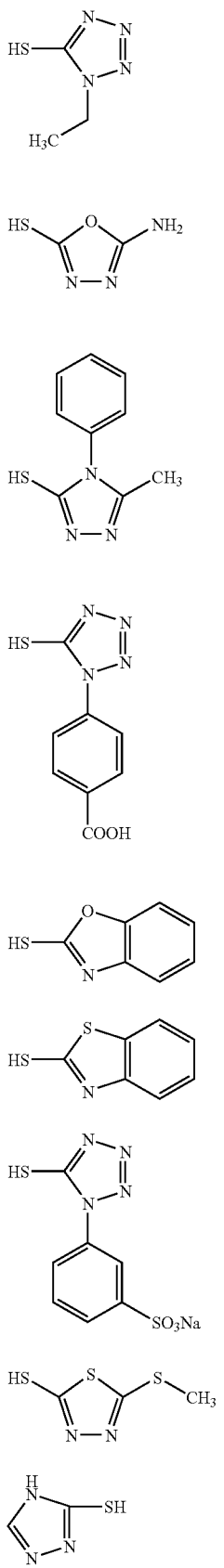
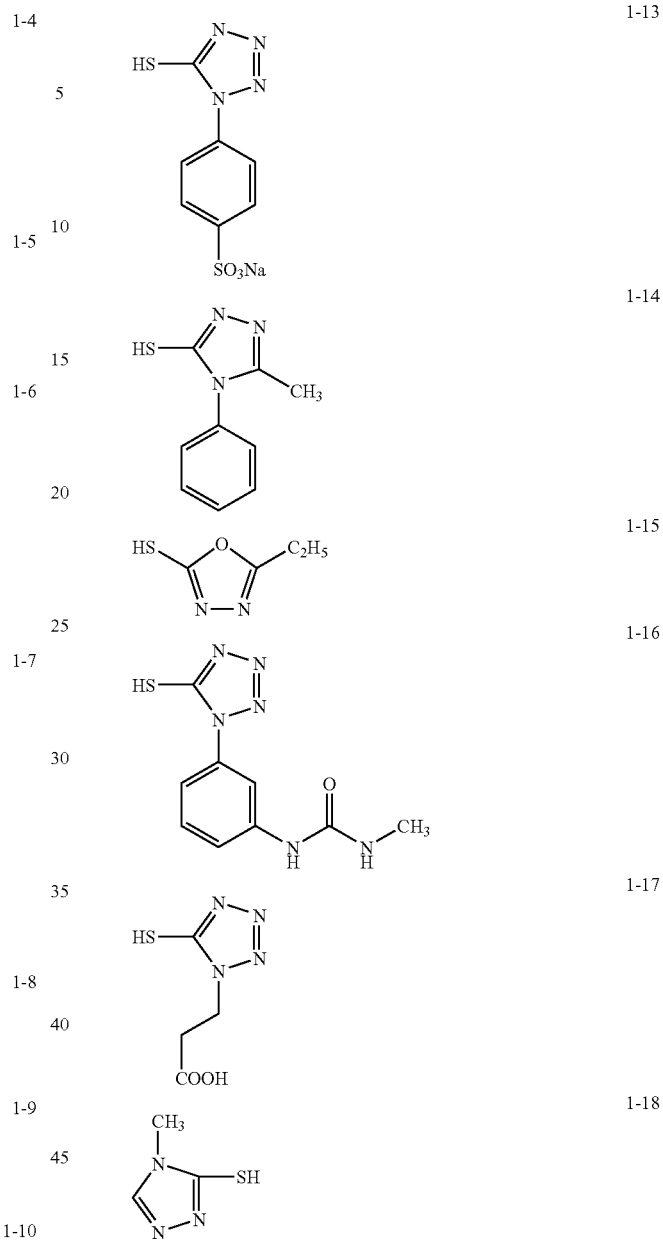

Then, a thioether compound represented by Formula (2) will be described.

$R_2$ and $R_3$ in Formula (2) each represent an alkyl group, an aryl group or a heterocyclic group. $R_2$ and $R_3$ each may be the same or different, and they may be joined to form a ring.

The alkyl group represented by $R_2$ and $R_3$ in Formula (2) includes, for example, a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group, and a benzyl group. The aryl group includes, for example, a phenyl group and a naphthyl group. The heterocyclic group includes, for example, an oxazole ring, an imidazole ring, a thiazole ring, a triazole ring, a selenazole ring, a tetrazole ring, an oxadiazole ring, a thiadiazole ring, a thiazine ring, a triazine ring, a benzoxazole ring, a benzothiazole ring, a benzoimidazole ring an indolenine ring, a benzoselenazole ring, a naphthothiazole ring, a triazaindolizine ring, a diazaindolizine ring, and a tetraazaindolizine ring. These substituents may further have a substituent.

Specific examples of the compounds represented by Formula (2), according to the present invention, will now be cited, however, the present invention is not limited thereto.

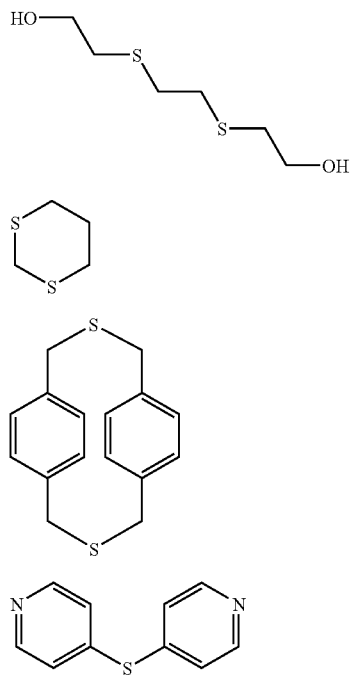

(Electrolyte Materials)

In the display element of the present invention, an electrolyte can incorporate any of the following compounds when required within the range of an amount that satisfy the condition of the present invention required for a total molar concentration of halogen ions or halogen atoms in a halide compound. Examples of the compounds include a potassium compound such as KCl, KI, or KBr; a lithium compound such as $LiBF_4$, $LiClO_4$, LiPFE, or $LiCF_3SO_3$; and a tetraalkylammonium compound such as tetraethylammonium perchlorate, tetrabutylammonium perchlorate, tetraethylammonium borofluoride, tetrabutylammonium borofluoride, or tetrabutylammonium halide. Further, there can preferably be used the fused salt electrolyte compositions described in Paragraph Nos. [0062]-[0081] of JP-A No. 2003-187881. Still further, there can also be used a compound which forms an oxidation-reduction pair such as $I^-/I_3^-$, $Br^-/Br_3^-$, or quinone/hydroquinone.

[Thickeners to be Added to the Electrolyte]

In the display element of the present invention, there can be used a thickener for the electrolyte, including gelatin, gum arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), a poly(vinyl acetal) (e.g., poly(vinyl formal) and poly(vinyl butyral)), a poly(vinyl ester), a poly(urethane), a phenoxy resin, poly(vinylidene chloride), a poly(epoxide), a poly(carbonate), poly(vinyl acetate), a cellulose ester, and a poly(amide); and including, as a transparent hydrophobic binder, cellulose acetate, cellulose acetate butyrate, polyester, polycarbonate, poly(acrylic acid), polyurethane and butyral resin.

These thickeners may be used in combinations of at least 2 types. There are further listed the compounds described on pages 71-75 of JP-A No. 64-13546. Of these, a compound preferably used includes a polyvinyl alcohol, a polyvinylpyrrolidone, a hydroxypropyl cellulose, and a polyalkylene glycol, from the viewpoint of enhancement of compatibility with various types of additives and of dispersion stability of white particles.

(Preparation of Electrolyte Layer)

The electrolyte layer of the present invention is preferably prepared by using any one of screen printing method, dispenser dropping method, and ink-jet printing method.

In the screen printing method, the electrode surface of a substrate is covered with a screen having a predetermined pattern, followed by placing an electrolyte solution on the screen. In the preparation method of dropping with a dispenser, a dispenser having a nozzle of 0.1 mm to 1 mm diameter is used. An electrolyte contained in the dispenser is filled in cells formed with walls at a predetermined position. In the ink-jet printing method, an electrolyte is applied as ink droplets through an ink-jet recording head driven with such as piezoelectricity.

[Porous White Scattering Layer]

The display element of the present invention may incorporate a porous white scattering layer from the viewpoint of enhancing display contrast and white display reflectance.

The porous white scattering layers which can be applied to the present invention are formed by coating and drying an aqueous mixture of aqueous polymers substantially insoluble in the electrolyte solvents and white pigment.

Examples of white pigments which can be used in the present invention include: titanium dioxide (anatase or rutile type), barium sulfate, calcium carbonate, aluminum oxide, zinc oxide, magnesium oxide, zinc hydroxide, magnesium hydroxide, magnesium phosphate, magnesium hydrogen phosphate, alkaline earth metallic salts, talc, kaolin, zeolite, acid clay, glass, and organic compounds such as polyethylene, polystyrene, acryl resins, ionomers, ethylene-vinyl acetate copolymeric resins, benzoguanamine resins, urea-formaldehyde resins, melamine-formaldehyde resins, or polyamide resins. These substances may be uses individually or in combination, or in the form in which voids, capable of varying the refractive index, are contained in the particles.

In the present invention, titanium dioxide, zinc oxide and zinc hydroxide are preferably employed among the-above described white particles. Further, titanium oxide may be titanium oxide which has been subjected to a surface treatment employing an inorganic oxide (such as $Al_2O_3$, AlO(OH), or $SiO_2$), or titanium oxide which has been subjected to a treatment employing an organic compound such as trimethylolethane, triethanolamine acetic acid salts, or trimethylcyclosilane, in addition to the above surface treatment.

Among these white particles, it is preferable to use titanium oxide or zinc oxide in view of minimization of coloration at high temperature and reflectance of elements due to refractive index.

Listed as an aqueous polymer which is substantially insoluble in electrolyte solvent according to the present invention may be water-soluble polymer and polymer which dispersed in water based solvent.

As polymers applicable to the present invention, there can be listed, for example, protein such as gelatin, or gelatin derivatives; cellulose derivatives; natural compounds including polysaccharides such as starch, gum arabic, dextran, pullulan, carrageenan; and synthetic polymers such as polyvinyl alcohol, polyethylene glycol, polyvinyl pyrrolidone, acrylamide polymers, or derivatives thereof. The gelatin derivatives include acetyl gelatin and phthalic gelatin. The polyvinyl alcohol derivatives include terminal alkyl group-modified polyvinyl alcohol and terminal mercapto group-modified polyvinyl alcohol. The cellulose derivatives include hydroxyethyl cellulose, hydroxypropyl cellulose, and carboxymethyl cellulose. In addition, there are also usable those described in Research Disclosure and on pages 71-75 of Unexamined Japanese Patent Application Publication (hereinafter referred to as JP-A) No. 64-13546; highly water-absorbing polymers, described in U.S. Pat. No. 4,960,681 and JP-A No. 62-245260, that is, homopolymers of vinyl monomers containing —COOM or —SO$_3$M (wherein M is a hydrogen atom or an alkali metal), or copolymers of these monomers or copolymers of the same with other monomers (for example, sodium methacrylate, ammonium methacrylate, or potassium acrylate). These binders may be used in combinations of at least 2 types.

In the present invention, preferably employed may be gelatin and derivatives thereof, or polyvinyl alcohol and derivatives thereof.

Listed as polymers dispersed in water based solvents may be latexes such as natural rubber latex, styrene butadiene rubber, butadiene rubber, nitrile rubber, chloroprene rubber, heat curable resins which are prepared by dispersing, in water based solvents, polyisocyanate based, epoxy based, acryl based, silicone based, polyurethane based, urea based, phenol based, formaldehyde based, epoxy-polyamide based, melamine based, or alkyd based resins, or vinyl based resins. Of these polymers, it is preferable to employ water based polyurethane resins described in JP-A No. 10-76621.

"Being substantially insoluble in electrolyte solvents", as described in the present invention, is defined as a state in which the dissolved amount per kg of the electrolyte solvents is 0-10 g in the temperature range of −20 to 120° C. It is possible to determine the above dissolved amount employing the methods known in the art, such as a weight measuring method, or a component quantitative method utilizing liquid chromatogram and gas chromatogram.

In the present invention, a preferred embodiment of the aqueous mixture of water based compounds and white pigments is dispersed in water with the dispersion methods known in the art. The mixing ratio of water based compounds/titanium oxide is preferably in the range of 1-0.01 in terms of volume ratio, but is more preferably in the range of 0.3-0.05.

In the present invention, a media on which the aqueous mixture of the water based compounds and white pigments is coated may be located anywhere as long as they are located on the structural components between the counter electrodes of the display element. However, it is preferable that they are provided on at least one of the above counter electrodes. Examples of media providing methods include a coating system, a liquid spraying system, a spraying method via a gas phase, such as a system which jets liquid droplets employing vibration of a piezoelectric element such as a piezoelectric system ink-jet head, a BUBBLE JET (registered trade name) ink-jet head which ejects liquid droplets employing a thermal head utilizing bumping, and a spray system in which liquid is sprayed via air or liquid pressure.

An appropriate coating system may be selected from any of the coating systems known in the art, and examples thereof include an air doctor coater, a blade coater, a rod coater, a knife coater, a squeeze coater, an impregnation coater, a reverse roller coater, a transfer roller coater, a curtain coater, a double roller coater, a slide hopper coater, a gravure coater, a kiss roller coater, a bead coater, a spray coater, a calender coater, and an extrusion coater.

Methods to dry the aqueous mixture of water based compounds and white pigments provided on the medium are not particularly limited as long as they facilitate water evaporation. Examples thereof include heating employing a heating source, a heating method employing infrared radiation, and a heating method utilizing electromagnetic induction. Further, water evaporation may be performed under reduced pressure.

The term "porous" referred to in the present invention is of a penetrating state capable of inducing silver dissolution and deposition reaction and enabling ion species to move between electrodes, wherein a porous white scattering substance is formed by coating and drying the dispersion on an electrode, and an electrolyte liquid incorporating silver or a compound containing silver in its chemical structure is applied on the scattering substance, followed by being sandwiched with opposed electrodes to produce a potential difference between the opposed electrodes.

In the display element of the present invention, during coating and drying of the aforesaid water based dispersion or after drying thereof, the above water based dispersion is preferably hardened using a hardener.

As examples of hardeners used in the present invention, there are listed, for example, hardeners described in column 41 of U.S. Pat. No. 4,678,739, ibid. U.S. Pat. No. 4,791,042, and JP-A Nos. 59-116655, 62-245261, 61-18942, 61-249054, 61-245153, and 4-218044. More specifically, there are exemplified aldehyde based hardeners (e.g. formaldehyde), aziridine based hardeners, epoxy based hardeners, vinyl sulfone based hardeners (e.g., N,N'-ethylene-bis(vinylsulfonylacetamido)ethane), N-methylol based hardeners (e.g., dimethylol urea), boric acid, metaboric acid, or polymer hardeners (compounds described, for example, in JP-A No. 62-234157). When gelatin is used as a polymer, of these hardeners, a vinyl sulfone based hardener and a chlorotriazine based hardener are preferably used individually or in combination. Further, when a polyvinyl alcohol is used, a boron-containing compound such as boric acid or metaboric acid is preferably used.

There are used 0.001-1 g of, preferably 0.005-0.5 g of these hardeners per 1 g of the water based compound. Further, to enhance film strength, it is optionally possible to carry out heat treatment or moisture controlling during hardening reaction.

[Electrodes]

In the display element of the present invention, at least one of the opposed electrodes is preferably a metal electrode. For the metal electrode, there can be used a metal known in the art such as platinum, gold, silver, copper, aluminum, zinc, nickel, titanium, or bismuth, and alloys thereof. For the metal electrode, preferable are metals exhibiting a work function close to the oxidation-reduction potential of silver in an electrolyte. Of these, a silver electrode or an electrode having a silver content of at least 80% is advantageous to maintain a reduced state of silver, which is also superior in anti-staining of the electrode. As preparation methods of the electrode, there can be used conventional ones such as a vapor deposition method, a printing method, an ink-jet method, a spin coating method, and a CVD method.

Further, in the display element of the present invention, at least one of the opposed electrodes is preferably a transparent electrode. The transparent electrode is not specifically limited if being transparent and electrically conductive. Examples thereof include Indium Tin Oxide (ITO: indium tin oxide);

Indium Zinc Oxide (IZO-indium zinc oxide), fluorine-doped tin oxide (FTO), indium oxide, zinc oxide, platinum, gold, silver, rhodium, copper, chromium, carbon, aluminum, silicon, amorphous silicon, and BSO (Bismuth Silicon Oxide). To form an electrode in such a manner, for example, mask deposition via a method of sputtering an ITO film on a substrate, or patterning via a photolithographic method after formation of the entire ITO film may be carried out. The surface resistance value is preferably at most 100Ω/□, more preferably at most 10Ω/□. The thickness of the transparent electrode is not specifically limited, but is commonly 0.1-20 μm.

[Porous Electrode Incorporating Metal Oxide]

Further, in the display element of the present invention, a porous electrode incorporating a metal oxide can also be used.

In the display element of the present invention, it was found that when, of the opposed electrodes, the electrode on the side of no image observation was protected with a porous electrode incorporating a metal oxide, oxidation-reduction reaction of silver or a compound containing silver in its chemical structure on the side of no image observation occurred on or within the porous electrode incorporating the metal oxide. Accordingly, the option of selecting the type of the electrode on the side of no image observation can be broadened and the durability thereof can be enhanced.

A metal oxide constituting the porous electrode of the present invention includes, for example, titanium oxide, silicon oxide, zinc oxide, tin oxide, Sn-doped indium oxide (ITO), antimony-doped tin oxide (ATO), fluorine-doped tin oxide (FTO), and aluminum-doped zinc oxide, or a mixture thereof.

The porous electrode is formed via bonding or contacting of plural particles of any of the above metal oxide. The average particle diameter of the metal oxide fine particles is preferably 5 nm-10 μm, more preferably 20 nm-1 μm. Further, the specific surface area of the metal oxide particles is preferably $1\times10^{-3}$-$1\times10^{2}$ m$^2$/g, more preferably $1\times10^{-2}$-10 m$^2$/g. Still further, any appropriate shape such as the amorphous, acicular, or spherical one is employable as the shape of the metal oxide particles.

As the forming or bonding method of metal oxide particles, a sol-gel method and a firing method known in the art are employable, including, methods described, for example, in 1) Journal of the Ceramic Society of Japan, 102, 2, P 200 (1994), 2) Yogyo Kyokai Shi, 90, 4, p 157, and 3) J. of Non-Cryst. Solids, 82, 400 (1986). Further, there can be used a method in which titanium oxide dendrimer particles prepared using a gas phase method are coated on a substrate via dispersion on a solution and then a solvent is removed by drying at a temperature of about 120-about 150° C. to obtain a porous electrode. The metal oxide particles are preferably in the state of being bonded, and further in the state where a resistance of at least 0.1 g, preferably at least 1 g, is exhibited, based on measurement using a continuous weight surface measurement system (e.g., a scratch tester).

The term "porous" referred to in the present invention is of a penetrating state where a porous electrode is arranged and then a potential difference is produced between opposed electrodes, which enables induction of silver dissolution and deposition reaction and enables ion species to move in the porous electrode.

[Electron Insulating Layer]

In the display element of the present invention, an electron insulating layer can be provided.

It is only necessary for an electron insulating layer applicable to the present invention to be a layer exhibiting ion conductivity as well as electron insulating properties. There are listed, for example, a solid electrolyte film in the form of film of a polymer with a polar group or a salt; a pseudo-solid electrolyte film composed of a porous film, exhibiting high electron insulating properties, in the voids of which an electrolyte is held; a polymer porous film having voids; and a porous body of an inorganic material such as a silicon-containing compound featuring a low specific dielectric constant.

As a forming method of a porous film, there can be used any appropriate method known in the art such as a firing method (fusing method) (utilizing pores created among particles prepared by partially fusing polymer fine particles or inorganic particles via addition of a binder); an extraction method (in which a constituent layer is formed using an organic or inorganic substance soluble in a solvent and a binder insoluble in the solvent, followed by dissolving the organic or inorganic substance with the solvent to obtain fine pores); a foaming method of allowing a high molecular weight polymer to foam by heating or degassing; a phase conversion method of allowing a mixture of polymers to be phase-separated by use of a good solvent and a poor solvent; and a radiation exposure method of forming pores via exposure of various kinds of radiations. Specifically, there can be listed the electron insulating layers described in JP-A Nos. 10-30181, 2003-107626; Examined Japanese Patent Application Publication No. 7-95403; and Japanese Patent Publication Nos. 2635715, 2849523, 2987474, 3066426, 3464513, 3483644, 3535942, and 3062203.

[Other Additives]

The constituent layers of the display element of the present invention include auxiliary layers such as a protective layer, a filter layer, an antihalation layer, a crossover light cutting layer, and a backing layer. These auxiliary layers may incorporate, as appropriate, chemical sensitizers, noble metal sensitizers, photosensitive dyes, supersensitizers, couplers, high boiling point solvents, antifoggants, stabilizers, development inhibitors bleach accelerators, fixing accelerators, color mixing inhibitors, formalin scavengers, toning agents, hardeners, surfactants, thickeners, plasticizers, lubricants, UV absorbents, anti-irradiation dyes, filter light absorbing dyes, fungicides, polymer latexes, heavy metals, antistatic agents, and matting agents.

The additives described above are detailed in Research Disclosure (hereinafter referred to simply as RD), Vol. 176, Item/17643 (December 1978), RD, Vol. 184, Item/18431 (August 1979), RD, Vol. 187, Item/18716 (November 1979), and RD, Vol. 308, Item/308119 (December 1989).

Types of compounds shown in three of these RD articles are listed below with the described portions thereof.

| Additive | RD 17643 Page & Class | RD 18716 Page & Class | RD 308119 Page & Class |
|---|---|---|---|
| Chemical Sensitizer | 23 III | 648 upper right | 96 III |
| Sensitizing Dye | 23 IV | 648-649 | 996-8 IV |
| Desensitizing Dye | 23 IV | | 998 IV |
| Dye | 25-26 VIII | 649-650 | 1003 VIII |
| Development Accelerator | 29 XXI | 648 upper right | |
| Antifoggant, Stabilizer | 24 IV | 649 upper right | 1006-7 VI |
| Whitening Agent | 24 V | | 998 V |

-continued

| Additive | RD 17643 Page & Class | RD 18716 Page & Class | RD 308119 Page & Class |
|---|---|---|---|
| Hardener | 26 X | 651 left | 1004-5 X |
| Surface Active Agent | 26-7 XI | 650 right | 1005-6 XI |
| Antistatic Agent | 27 XII | 650 right | 1006-7 XIII |
| Plasticizer | 27 XII | 650 right | 1006 XII |
| Lubricant | 27 XII | | |
| Matting Agent | 28 XVI | 650 right | 1008-9 XVI |
| Binder | 26 XXII | | 1003-4 IX |
| Support | 28 XVII | | 1009 XVII |

[Layer Structure]

The constituent layers between the opposed electrodes in the display element of the present invention will now further be described.

As a constituent layer according to the display element of the present invention, a constituent layer incorporating a positive hole transport material can be provided. The positive hole transport material includes, for example, an aromatic amine, a triphenylene derivative, an oligothiophene compound, a polypyrrole, a polyacetylene derivative, a polyphenylene vinylene derivative, a polythienylene vinylene derivative, a polythiophene derivative, a polyaniline derivative, a polytoluidine derivative, CuI, CUSCN, $CuInSe_2$, $Cu(In,Ga)Se$, $CuGaSe_2$, $Cu_2O$, CUS, $CuGaS_2$, $CuInS_2$, $CuAlSe_2$, GaP, NiO, CoO, FeO, $Bi_2O_3$, $MoO_2$, and $Cr_2O_3$.

[Substrate]

As a substrate usable in the present invention, there are also preferably used a synthetic plastic film including a polyolefin such as polyethylene or polypropylene, a polycarbonate, cellulose acetate, polyethylene terephthalate, polyethylene dinaphthalene dicarboxylate, a polystyrene naphthalate, polyvinyl chloride, polyimide, a polyvinyl acetal, and polystyrene. A syndiotactic structure polystyrene is also preferable. These can be prepared via the methods described, for example, in each of JP-A Nos. 62-117708, 1-46912, and 1-178505. Further, there are exemplified metal substrates such as stainless steel; paper supports such as baryta paper or resin coated paper; supports prepared by arranging a reflection layer on any of the above plastic films; and those which are described in JP-A No. 62-253195 (pages 29-31) as supports. There can also preferably be used those described on page 28 of RD No. 17643; from the right column of page 647 to the left column of page 648 of RD No. 18716; and on page 879 of RD No. 307105. As these substrates, there can be used those heat-treated at a temperature of at most Tg so that core-set curl is decreased, as described in U.S. Pat. No. 4,141,735. Further, any of these supports may be surface-treated to enhance adhesion of the support to other constituent layers. In the present invention, there may be employed, as surface treatment, glow discharge treatment, ultraviolet irradiation treatment, corona discharge treatment, and flame treatment. Further, the supports described on pages 44-149 of Kochi Gijutsu (Known Techniques), No. 5 (issued on Mar. 22, 1991, published by Aztech Corp.) may be used. Still further, there are listed those described on page 1009 of RD, No. 308119, and in "Supports" of Product Licensing Index, Vol. 92, Page 108. In addition, glass substrates, and epoxy resins kneaded with glass powder are employable.

[Other Components of the Display Element]

For the display element of the present invention, any appropriate sealing agent, columnar structure substance, and spacer particle are employable, if appropriate.

The sealing agent, functioning to enclose the content in order not to leak out, is also referred to as an enclosing agent. As the sealing agent, there are employable curable type resins including thermally curable, light curable, moisture curable, or anaerobically curable resins such as epoxy resins, urethane resins, acrylic resins, vinyl acetate reins, ene-thiol resins, silicone resins, or modified polymer resins.

The columnar structure substance provides strong self-holding force (strength) between the substrates, including, for example, columnar structure substances such as cylindrical, square pole, elliptically cylindrical, and trapezoidally cylindrical substances, wherein these substances are arranged so as to form a predetermined pattern such as a grid at regular intervals. A stripe arrangement at predetermined intervals may be also employed. The columnar structure substance is not arranged at random, but preferably arranged in such a manner as to appropriately hold the distance between the substrates, and not to inhibit displaying images, wherein the columnar structure substance is arranged at regular intervals, in a pattern in which the intervals are gradually varied, or in a predetermined pattern repeated at regular intervals. When the ratio of the display area of the display element occupied by the columnar structure substance is in the range of 1%-40%, the display element exhibits practically adequate strength.

A spacer may be placed between a pair of the substrates to uniformly hold the gap thereof. As the spacer, spherical objects of resins or inorganic oxides are exemplified. Further, an adhesive spacer, the surface of which is coated with a thermoplastic resin, may suitably be used. To uniformly hold the gap between the substrates, the columnar structure substance may be provided by itself, and both of the spacer and the columnar structure substance may be also provided. Further, instead of the columnar structure substance, the spacer may be used by itself as a space-holding member. When a columnar structure is formed, the diameter of the spacer is equivalent to at most the height of the columnar structure substance, but is preferably equal to the height thereof. When no columnar structure substance is formed, the diameter of the spacer is equivalent to the cell gap thickness.

[Screen Printing]

In the present invention, a sealing agent, a columnar structure substance, and an electrode pattern may be formed via a screen printing method. In the screen printing method, the electrode surface of a substrate is covered with a screen having a predetermined pattern, followed by placing a printing material (being a composition, to form the columnar structure substance, such as radiation curable resins) on the screen. Subsequently, a squeegee is moved at a predetermined pressure, angle, and rate, whereby the printing material is transferred onto the substrate via the screen pattern. Then, the transferred material is thermally cured and dried. When the columnar structure substance is formed via the screen printing method, resin materials to be used are not limited to the radiation curable resins. For example, thermally curable resins or thermoplastic resins such as epoxy resins or acrylic resins may be also used. Examples of the thermoplastic resins include polyvinyl chloride resins, polyvinylidene chloride resins, polyvinyl acetate resins, polymethacrylate resins, polyacrylate resins, polystyrene resins, polyamide resins, polyethylene resins, polypropylene resins, fluorine resins, polyurethane resins, polyacrylonitrile resins, polyvinyl ether resins, polyvinyl ketone resins, polyether resins, polyvinyl pyrrolidone resins, saturated polyester resins, polycarbonate resins, and chlorinated polyether resins. These resin materials are preferably used in a paste form prepared by dissolving corresponding resins in appropriate solvents.

After the columnar structure substance has been formed on the substrate as described above, a spacer is provided on at least one of the substrates, as appropriate, and then a pair of the substrates are stacked to form an empty cell, wherein the electrode-forming surfaces are faced each other. A display cell is obtained by bonding a pair of the stacked substrates via heat application under pressure applied from both sides thereof. To prepare a display element, an electrolyte composition is injected between the substrates, for example, via a vacuum injection method. Alternatively, in the bonding process of the substrates, a liquid crystal component may be enclosed just before bonding of the substrates, after the electrolyte component has been dripped on one of the substrates.

[Driving Method of Display Element]

In the display element of the present invention, it is preferable to perform a driving operation such that blackened silver is deposited by applying a voltage of at least the deposition overpotential and the deposition of blackened silver is continued by applying a voltage of at most the deposition overpotential. Performance of such a driving operation results in reduced writing energy, reduced load of the drive circuit, and enhanced writing speed as an image screen. Existence of overpotential in electrode reaction is generally known in the electrochemistry field. The overpotential is detailed, for example, on page 121 of "Denshi-ido no Kagaku/Denkikagaku Nyumon (Chemistry of Electron Transfer/Introduction to Electrochemistry)" (1996, published by Asakura Shoten). The display element of the present invention is also regarded as electrode reaction of an electrode with silver in an electrolyte so that existence of an overpotential in silver dissolution and deposition is readily understood. Since the magnitude of an overpotential is controlled by an exchange current density, from the fact that after formation of blackened silver, deposition of blackened silver can be continued via application of a voltage of at most a deposition overpotential, it is presumed that the surface of blackened silver has less excess energy, resulting in easy electron injection.

The driving operation for the display element of the present invention is either a simple matrix drive or an active matrix drive. In the present invention, the simple matrix drive refers to a driving method, in which current is successively applied to a circuit formed by vertically crossing of an anode line containing plural anodes to a facing cathode line containing plural cathodes. The use of the simple matrix drive has the advantage that the circuit structure and the driving IC can be simplified to reduce the production cost. The active matrix drive refers to a driving method, in which scanning lines, data lines, and current supplying lines are formed on a grid, and driving is carried out via TFT circuits positioned in each of the grids. The active matrix drive is advantageous in gradation and memory functions since a switching function is allocated to each pixel. The circuit described, for example, in FIG. 5 of JP-A 2004-29327 is employable.

[Commercial Applications]

The display element of the present invention is applied to fields including electronically published books, ID cards, public use, transportation, broadcasting, financial clearance, and distribution and logistics. Specific examples include door keys, student ID cards, employee ID cards, membership cards, convenience store cards, department store cards, vending machine cards, gas station cards, subway and railroad cards, bus cards, cashing cards, credit cards, highway cards, driver's license cards, hospital consultation cards, electronic medical charts, health insurance cards, basic resident registers, passports, and electronic books.

EXAMPLES

The present invention will now specifically be described with reference to examples, but the scope of the present invention is not limited to them. Incidentally, "part" or "%" to be shown in the examples represents "part by weight" or "% by weight" unless otherwise specified.

<<Preparation of Electrolyte Liquid>>

(Preparation of Electrolyte Liquid 1)

To 2.5 g of dimethyl sulfoxide was added silver iodide, the added amount of silver iodide being determined so as to correspond to 0.2 mmol/g for 1 g of dimethyl sulfoxide, then further was added 2-mercaptobenzimidazole (abbreviated as MBI) in an amount of the same molar amount as silver iodide, The mixture was completely dissolved to obtain electrolyte liquid 1.

(Preparation of Electrolyte Liquid 2)

To 2.5 g of dimethyl sulfoxide was added silver toluenesulfonate, the added amount of silver toluenesulfonate being determined so as to correspond to 0.2 mmol/g for 1 g of dimethyl sulfoxide, then further was added exemplified compound 1-12 in an amount of the same molar amount as silver iodide. The mixture was completely dissolved to obtain Electrolyte Liquid 2.

(Preparation of Electrolyte Liquid 3)

Electrolyte liquid 2 was prepared in the same manner as preparation method of electrolyte liquid 2, except that dimethyl sulfoxide was replaced with the same amount of propylene carbonate.

(Preparation of Electrolyte Liquid 4)

Electrolyte liquid 4 was prepared in the same manner as preparation method of electrolyte liquid 3, except that an amount of silver toluenesulfonate was changed from the amount correspond to 0.2 mmol/g for 1 g of propylene carbonate to 0.15 mmol/g.

(Preparation of Electrolyte Liquid 5)

To 2.5 g of exemplified compound L-1 was added silver toluenesulfonate, the added amount of silver toluenesulfonate being determined so as to correspond to 0.15 mmol/g for 1 g of exemplified compound L-1, further was added exemplified compound 1-12 in an amount of 5 times of the molar amount of silver toluenesulfonate. The mixture was completely dissolved to obtain electrolyte liquid 5.

(Preparation of Electrolyte Liquid 6)

Electrolyte liquid 6 was prepared in the same manner as preparation method of electrolyte liquid 5, except that an amount of silver toluenesulfonate was changed from the amount correspond to 0.15 mmol/g for 1 g of exemplified compound L-1 to 0.20 mmol/g.

(Preparation of Electrolyte Liquid 7)

Electrolyte liquid 7 was prepared in the same manner as preparation method of electrolyte liquid 5, except that an amount of silver toluenesulfonate was changed from the amount correspond to 0.15 mmol/g for 1 g of exemplified compound L-1 to 0.3 mmol/g.

(Preparation of Electrolyte Liquid 8)

Electrolyte liquid 8 was prepared in the same manner as preparation method of electrolyte liquid 5, except that an amount of silver toluenesulfonate was changed from the amount correspond to 0.15 mmol/g for 1 g of exemplified compound L-1 to 0.6 mmol/g.

(Preparation of Electrolyte Liquid 9)

To 2.5 g of exemplified compound L-1 was added silver toluenesulfonate, the added amount of silver toluenesulfonate being determined so as to correspond to 0.3 mmol/g for 1 g of exemplified compound L-1, further was added exemplified compound 1-12 in an amount of two times of the molar amount of silver toluenesulfonate, and was added exemplified compound 1-18 in an amount of 2.5 times of the molar amount of silver toluenesulfonate The mixture was completely dissolved to obtain electrolyte liquid 9.

(Preparation of Electrolyte Liquid 10)

Electrolyte liquid 10 was prepared in the same manner as preparation method of electrolyte liquid 9, except that exemplified compound 1-18 was replaced with the same amount of exemplified compound 2-1.

(Preparation of Electrolyte Liquid 11)

Electrolyte liquid 11 was prepared in the same manner as preparation method of electrolyte liquid 7, except that the added amount of compound 1-12 was changed from 5 times of the molar amount of silver toluenesulfonate to the same molar amount of silver toluenesulfonate.

(Preparation of Electrolyte Liquid 12)

Electrolyte liquid 12 was prepared in the same manner as preparation method of electrolyte liquid 7, except that the added amount of compound 1-12 was changed from 5 times of the molar amount of silver toluenesulfonate to 2 times of the molar amount of silver toluenesulfonate.

(Preparation of Electrolyte Liquid 13)

Electrolyte liquid 13 was prepared in the same manner as preparation method of electrolyte liquid 7, except that the added amount of compound 1-12 was changed from 5 times of the molar amount of silver toluenesulfonate to 10 times of the molar amount of silver toluenesulfonate.

(Preparation of Electrolyte Liquid 14)

Electrolyte liquid 14 was prepared in the same manner as preparation method of electrolyte liquid 7, except that the added amount of compound 1-12 was changed from 5 times of the molar amount of silver toluenesulfonate to 15 times of the molar amount of silver toluenesulfonate.

(Preparation of Electrolyte Liquid 15)

Electrolyte liquid 15 was prepared in the same manner as preparation method of electrolyte liquid 7, except that exemplified compound L-1 was replaced with the same amount of exemplified compound L-2.

<<Preparation of Electrode>>

(Preparation of Electrode 1)

An ITO film was formed on a glass substrate of a size of 2 cm×4 cm with a thickness of 1.5 mm using a commonly known method to obtain a transparent electrode (electrode 1).

(Preparation of Electrode 2)

A silver-palladium electrode (electrode 2) of an electrode thickness of 0.8 μm was formed on a glass substrate of a size of 2 cm×4 cm with a thickness of 1.5 mm using a commonly known method to obtain electrode 2.

(Preparation of Electrode 3)

An isopropanol mixture liquid was prepared by ultrasonic dispersion of 20 weight % of titanium oxide with isopropanol containing 2 weight % of polyvinyl alcohol (having an average polymerization degree of 3500 and a saponification degree of 87%). Thus prepared isopropanol mixture liquid was applied with a thickness of 100 μm on electrode 2 on the edge of which was coated with an olefinic sealing agent containing 10 volume % of glass beads having an average particle size of 40 μm. Then the coated isopropanol mixture liquid was dried at 15° C. for 30 minutes so as to evaporate the solvent, and was further dried at 15° C. for 30 minutes to obtain electrode 3.

The abbreviations for silver salt solvents and organic solvents shown in Table 1 mean as follow.

MBI: 2-mercaptobenzimidazole
DMSO: dimethyl sulfoxide
PC: propylene carbonate

<<Preparation of Display Elements>>

[Preparation of Display Element 1]

Electrode 3 and electrode 1 were bonded together, followed by heat pressing to prepare an empty cell. Electrolyte liquid 1 was vacuum injected into the empty cell, and the injection inlet was sealed with an epoxy-based ultraviolet curable resin to prepare Display Element 1.

[Preparation of Display Elements 2-15]

Display Elements 2-15 were prepared in the same manner as in preparation of Display Element 1 except that electrolyte liquid 1, having been used in preparation of Display Element 1, was exchanged to electrolyte liquids 2-15, respectively.

<<Evaluation of the Display Elements>>

(Determination of Reflectance During White Display)

White displaying was carried out by applying a voltage of 1.5 V to each of the prepared display elements for 3 seconds, and then the reflectance at 550 nm was determined using spectrophotometer CM-3700d (produced by Konica Minolta Sensing, Inc.). The determined reflectance was designated as $R_w(\%)$ which was employed as an indicator for the reflectance during white display.

(Evaluation of Display Speed)

White displaying was carried out by applying a voltage of 1.5 V to each of the prepared display elements for 3 seconds, followed by conducting gray displaying via application of a voltage of −1.5 V for 0.5 second, and then the reflectance at 550 nm was determined using spectrophotometer CM-3700d (produced by Konica Minolta Sensing, Inc.). The determined reflectance was designated as $R_{Glay}(\%)$ which was employed as an indicator for the display speed. Herein, a lower $R_{Glay}(9)$ indicates higher display speed.

(Evaluation of Storage Stability)

The prepared display elements each were subjected to 20 times of a pair of repeated change of the storage conditions: (1) kept at −20° C. for 1.5 hours; (2) kept at 80° C. for 12 hours. Then each display element was kept at normal temperature for 1 hour. The reflectance of before the test and after the test of each display element was measured in the same manner as for evaluation of display speed using spectrophotometer CM-3700d (produced by Konica Minolta Sensing, Inc.) The difference of reflectance $\Delta R_{Glay}(\%)$ of before the test and after the test were measured. The obtained $\Delta R_{Glay}(\%)$ was used as an index for storage stability. Here, it was decided that the less $\Delta R_{Glay}(\%)$, the superior the storage stability.

The results obtained as described above are shown in Table 1.

TABLE 1

| Display Element Number | Compound containing silver in the chemical structure | | | Silver Salt Solvent | | | | Evaluation results for Display Element | | | |
|---|---|---|---|---|---|---|---|---|---|---|---|
| | Kind | Silver/Organic Solvent (mmol/g) | [x]/[Ag] | Kind | Silver Salt Solvent/Silver | Organic Solvent Kind | | Reflectance during White Display $R_W$ (%) | Display Speed $R_{Glay}$ (%) | Storage Stability $\Delta R_{Glay}$ (%) | Remarks |
| | | | | | | | Dielectric Constant | Boiling point (° C.) | | | |
| 1 | AgI | 0.2 | 1.0 | MBI | 1 | DMSO | 47 | 189 | 45 | 20 | 18 | Comp. |
| 2 | *1 | 0.2 | 0 | *2 1-12 | 1 | DMSO | 47 | 189 | 58 | 18 | 17 | Comp. |
| 3 | *1 | 0.2 | 0 | *2 1-12 | 1 | PC | 66 | 242 | 60 | 16 | 15 | Comp. |
| 4 | *1 | 0.15 | 0 | *2 1-12 | 1 | PC | 66 | 242 | 60 | 25 | 12 | Comp. |

TABLE 1-continued

| Display Element Number | Compound containing silver in the chemical structure Kind | Silver/Organic Solvent (mmol/g) | [x]/[Ag] | Silver Salt Solvent Kind | Silver Salt Solvent/Silver | Organic Solvent Kind | Dielectric Constant | Boiling point (° C.) | Reflectance during White Display $R_W$ (%) | Display Speed $R_{Glay}$ (%) | Storage Stability $\Delta R_{Glay}$ (%) | Remarks |
|---|---|---|---|---|---|---|---|---|---|---|---|---|
| 5 | *1 | 0.15 | 0 | *2 1-12 | 5 | *2 L-1 | 39 | 204 | 61 | 24 | 10 | Comp. |
| 6 | *1 | 0.2 | 0 | *2 1-12 | 5 | *2 L-1 | 39 | 204 | 62 | 8 | 3 | Inv. |
| 7 | *1 | 0.3 | 0 | *2 1-12 | 5 | *2 L-1 | 39 | 204 | 62 | 4 | 5 | Inv. |
| 8 | *1 | 0.6 | 0 | *2 1-12 | 5 | *2 L-1 | 39 | 204 | 60 | 12 | 12 | Comp. |
| 9 | *1 | 0.3 | 0 | *2 1-12/1-18 | 5 | *2 L-1 | 39 | 204 | 63 | 3 | 1 | Inv. |
| 10 | *1 | 0.3 | 0 | *2 1-12/2-1 | 5 | *2 L-1 | 39 | 204 | 62 | 2 | 2 | Inv. |
| 11 | *1 | 0.3 | 0 | *2 1-12 | 1 | *2 L-1 | 39 | 204 | 60 | 8 | 9 | Inv. |
| 12 | *1 | 0.3 | 0 | *2 1-12 | 2 | *2 L-1 | 39 | 204 | 61 | 5 | 6 | Inv. |
| 13 | *1 | 0.3 | 0 | *2 1-12 | 10 | *2 L-1 | 39 | 204 | 60 | 6 | 7 | Inv. |
| 14 | *1 | 0.3 | 0 | *2 1-12 | 15 | *2 L-1 | 39 | 204 | 61 | 9 | 9 | Inv. |
| 15 | *1 | 0.3 | 0 | *2 1-12 | 5 | *2 L-2 | 42 | 208 | 61 | 8 | 6 | Inv. |

[x]: Total molar concentration (mol/kg) of halogen ions or halogen atoms in a halide molecule
[Ag]: Total molar concentration (mol/kg) of silver or a compound containing silver in the chemical structure
*1: Silver toluenesulfonate
*2: Compound
Comp.: Comparative Example
Inv.: Present Invention The results listed in Table 1 clearly show that Display Element 1 having a halide compound in the electrolyte liquid exhibits a low reflectance when it displays white. Display Elements 4 and 5 each having a concentration of silver ions outside the range of the present invention have a low display speed. When the concentration of silver ions is set to be within the range of the present invention, the display speed becomes increased. In case of Display Element 3, which does not incorporate a cyclic carboxylic acid ester compound having a dielectric constant of 30 to 50 as an organic solvent, the display speed is decreased when it is subjected to repeated changes between high temperature and low temperature.

In contrast to these, Display Elements which satisfy the silver ion concentration conditions determined in the present invention and incorporate a cyclic carboxylic acid ester compound having a dielectric constant stipulated in the present invention, and fulfill the condition for halide ions in the present invention, are proved to exhibit a high display speed, and a small amount of decrease in display speed by subjected to repeated changes between high temperature and low temperature.

In particular, the effects of the present invention are more strengthen when the display elements satisfy all of the following conditions: the concentration of silver or the compound containing silver in the molecule dissolved in the organic solvent being in the range of 0.25 to 0.45 mmol/g; the total molar ratio of a mercapto compound and a thioether compound to the total moles of silver or the compound containing silver in the molecule being from 2 to 5; and containing at least two kinds of mercapto compounds or containing simultaneously one mercapto compound and one thioether compound.

The invention claimed is:
1. A display element comprising:
opposed electrodes; and
an electrolyte containing silver or a compound containing silver in a chemical structure thereof between opposed electrodes, and carrying out driving operation for the opposed electrodes to induce silver dissolution and deposition,
wherein the electrolyte satisfies the following requirements (a) to (c):
(a) containing as an organic solvent a cyclic carboxylic acid ester having a dielectric constant of 30 to 50;
(b) satisfying the following expression (1),

$$0 \leq [X]/[Ag] \leq 0.1, \qquad \text{Expression (1)}$$

wherein [X] is a total molar concentration (mol/kg) of halogen ions or halogen atoms contained in halide molecules, [Ag] is a total molar concentration (mol/kg) of silver or a compound containing silver in the chemical structure thereof; and
(c) a concentration of silver or a compound containing silver in the chemical structure thereof in the organic solvent being from 0.2 mmol/g to 0.5 mmol/g.

2. The display element as claimed in claim 1, wherein the concentration of silver or a compound containing silver in the chemical structure thereof in the organic solvent contained in the electrolyte is from 0.25 mmol/g to 0.45 mmol/g.

3. The display element as claimed in claim 1, wherein a boiling point of the organic solvent contained in the electrolyte is from 180° C. to 250° C.

4. The display element as claimed in claim 1, wherein the electrolyte contains at least one mercapto compound or at least one thioether compound.

5. The display element as claimed in claim 4, wherein the electrolyte contains a mercapto compound, the mercapto compound being represented by Formula (1):

Formula (1)

wherein M is a hydrogen atom, a metallic atom, or a quaternary ammonium; Z is a nitrogen-containing heterocycle, and n is an integer of 0-5; and $R_1$ is a hydrogen atom, a halogen atom, an alkyl group, an aryl group, an alkylcarbonamide group, an arylcarbonamide group, an alkylsulfonamide group, an arylsulfonamide group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxy group, or a heterocyclic group, provided that when n is at least 2, a plurality of R is may be the same or different and the plurality of R is may be joined to form a condensed ring.

6. The display element as claimed in claim 4, wherein the electrolyte contains a thioether compound, the thioether compound being represented by Formula (2):

$$R_2\text{—}S\text{—}R_3 \quad \text{Formula (2)}$$

wherein $R_2$ and $R_3$ each represent an alkyl group or a heterocylic group, provided that $R_2$ and $R_3$ each may be the same or different, and $R_2$ and $R_3$ may be joined to form a ring.

7. The display element as claimed in claim 4, wherein a total molar amount of a mercapto compound and a thioether compound is from 2 to 10 times of a total molar amount of silver or a compound containing silver in the chemical structure thereof.

8. The display element as claimed in claim 4, comprising two or more kinds of mercapto compounds.

9. The display element as claimed in claim 8, wherein the mercapto compounds are a mercaptotriazole or a mercaptooxadiazole.

10. The display element as claimed in claim 4, comprising at least one mercapto compound and at least one thioether compound.

* * * * *